United States Patent [19]

Dawans et al.

[11] 3,972,867
[45] Aug. 3, 1976

[54] CYANOCARBOXYLATE POLYMERS AND THEIR PROCESS OF MANUFACTURE

[75] Inventors: Francois Dawans, Bougival; Denise Nicolas, Maurepas, both of France

[73] Assignee: Institut Francais du Petrole, des Carburants et Lubrifiants et Entreprise de Recherches et d'Activities Petrolieres Elf, Rueil-Malmaison, France

[22] Filed: Mar. 27, 1975

[21] Appl. No.: 562,929

[30] Foreign Application Priority Data

Mar. 29, 1974  France .............................. 74.11257

[52] U.S. Cl. .................................... 526/14; 526/15; 526/19; 526/56; 526/49; 526/335; 526/339; 526/340; 526/342; 526/324

[51] Int. Cl.² ...................... C08C 19/22; C08F 8/30

[58] Field of Search ................. 260/94.2 R, 94.7 N, 260/94.7 A, 85.1, 83.3, 82.3, 83.5, 83.7; 450/621, 611, 610.5

[56] References Cited
UNITED STATES PATENTS 3,390,204  6/1968  Breslow .................... 260/94.7 N X
3,493,545  2/1970  Marsh ........................ 260/94.7 N X

*Primary Examiner*—William F. Hamrock
*Attorney, Agent, or Firm*—Millen, Raptes & White

[57] ABSTRACT

Cyanocarboxylate polymers and copolymers are prepared by reacting a polymer or copolymer of conjugated diolefin with a cyanocarboxylate compound of the formula:

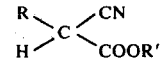

where R and R' are hydrogen atoms or alkyl, cycloalkyl, aryl or acyl groups of 1–12 carbon atoms, or R is a COOR' group or halogen.

The resulting polymers or copolymers are useful as finishing agents or additives for unsaturated elastomers.

13 Claims, No Drawings

CYANOCARBOXYLATE POLYMERS AND THEIR PROCESS OF MANUFACTURE

This invention concerns new cyanocarboxylate polymers and their process of manufacture.

The manufacture process according to the invention is characterized by the reaction of an unsaturated polymer with a β-cyanocarboxylate compound of the formula:

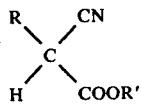

where the radicals R and R' are each a hydrogen atom or an alkyl, cycloalkyl, aryl or acyl group having 1–12 carbon atoms, or the radical R may also be a —COOR' group or halogen.

For greater availability, preference is given to cyanoacetic acid or to ethyl cyanoacetate.

The invention may be applied to homopolymers or copolymers having ethylenic unsaturation; preference is given to homopolymers or copolymers containing conjugated diolefins.

The invention specifically concerns the modification of homopolymers, for example 1,3-butadiene, isoprene and pentadiene homopolymers, or of their copolymers with one or more vinylic monomers such as styrene, acrylonitrile and methyl methacrylate.

The most appropriate polymers contain 1,3-butadiene polymerized according to 1,2 or 1,4-cis configuration. Preference is given to polybutadienes containing either more than 80% of 1,4-cis units or more than 60% of 1,2-units.

The molecular weight of the unsaturated polymer may vary and range, for example, between 1,000 and 500,000.

The cyanocarboxylate polymers according to the invention may be prepared by adding a β-cyanocarboxylate compound to the unsaturated polymer in the presence of radical initiators such as, for example, benzoyl peroxide or t-butyl perbenzoate.

According to a preferred embodiment, the polymer is reacted with the β-cyanocarboxylate compound at a temperature of 30°–120°C or preferably 60°–90°C, in the presence of oxygen, for example under atmospheric pressure, and a metal catalyst. The polymer is preferably dissolved into a linear or cyclic hydrocarbon solvent, such as heptane, cyclohexane, benzene, toluene, xylene or ethyl acetate. Molecular oxygen may be used in the pure state or in the form of air or air enriched with oxygen. For economical reasons, atmospheric pressure is preferred but one may also operate under higher pressures according to the invention. The metal catalyst is selected among the salts or chelates of metals pertaining to groups I B, VII B or VIII of the periodic table of the elements, such as cobalt, copper, tin or manganese bromides, acetates, acetylacetonates, napthenates, benzoates or octoates; combined metal catalysts may also be used. The concentration of metal catalyst in the reaction medium is from 0.05 to 5, preferably from 0.5 to 2 parts by weight of metal per 100 parts by weight of polymer. The reaction time depends on several factors such as reaction temperature, polymer concentration, catalyst concentration, oxygen supply velocity and cyanocarboxylate content; it is preferably from 30 minutes to 5 hours, so as to introduce cyanocarboxylate groups into the polymer in sufficient amount.

An advantage of the preferred embodiment of the invention lies in the possibility of varying at will the polymer modification ratio according to the reaction conditions and particularly the respective contents of polymer and cyanocarboxylate compound in the reaction medium. As a rule, the conditions will be so selected that the double bonds of the polymer do not all react, so that it may be cross-linked or co-vulcanized later.

The polymer modification ratio, according to the invention, is preferably from 2 to 70 cyanocarboxylate units per each 100 polymer units. The proportions of the reactants are thus selected according to these values, the β-cyanocarboxylate compound being used in an amount of 0.1 to 150 moles per each 100 unsaturated units forming the polymer chain.

New polymers representative of the invention are preferentially 1,4-cis polybutadienes having ethyl cyanoacetate added thereto, of an average molecular weight by number of from 1,500 to 200,000 and of the general formula:

$$\left(\!-CH_2-CH=CH-CH_2-\!\right)_n\!\left(\!-CH_2-CH_2-CH-CH_2-\underset{NC\diagup^{CH}\diagdown COOC_2H_5}{\phantom{X}}\!\right)_m$$

wherein $n$ and $m$ are integers, $(n+m)$ representing more than 90% of the units constituting the polymer chain.

Other new polymers are preferentially 1,2-polybutadienes having ethyl cyanoacetate added thereto and possibly partially lactonized, of the general formula:

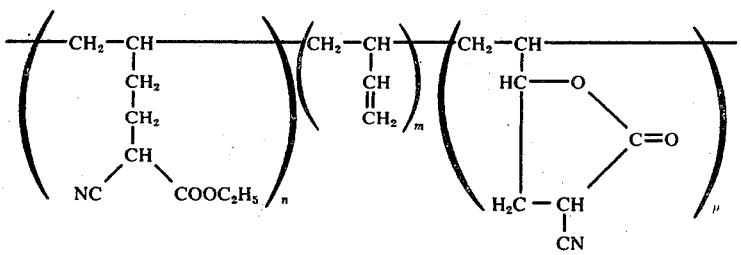

where $n$, $m$ and $p$ are integers, $(n+m+p)$ representing more than 60% of the units constituting the polymer chain.

Another advantage of the invention resides in the possibility of treating polymer solutions of relatively high concentration and polymers of high molecular weight at high reaction rates.

Another advantage resides in the possibility of directly treating polymer solutions discharged from the polymerization reactor, when the reaction is carried out in hydrocarbon phase; this avoids previous isolation and purification of the polymer.

Another advantage of the process according to the invention is to treat the polymer under mild conditions to avoid secondary reactions, for example, cross-linking, and to obtain cyanocarboxylate polymers soluble in conventional solvents and which can be used later in solution, for example for applications as coatings or finishes.

The new cyanocarboxylate polymers of the invention have improved compatibility with epoxide or polyester resins and good adherence to various substrates or reinforcing charges, for example, to glass. They are also useful as binders for paints, particularly for metals, and as finishes or sizing agents for glass fibers, which makes them more appropriate for subsequent inclusion into a rubbery, thermoplastic or thermohardening polymeric matrix.

They are also useful for glass fiber reinforced and, if desired, for tires having glass fiber reinforced casing.

The polymers of the invention may also be cross-linked by polycondensation and thus used in formulations of the polyurethane rubber type.

Covulcanization of cyanocarboxylate polymers, according to the invention, with polydiene elastomers or styrenebutadiene copolymers, results in the reduction of the swelling of rubbers due to solvents and oils.

Examples 1 to 9 are given for illustration and do not limit the present invention in any aspect whatsoever.

EXAMPLE 1

54 g of 1,2-polybutadiene (70% of 1,2-units, 27% of 1,4-cis units and 3% of 1,4-trans units) of an average molecular weight by number of 3,100 is dissolved into 234 cc of xylene and 1,000 cc of ethyl cyanoacetate. A solution of 3.6 g of benzoyl peroxide in 400 cc of xylene is added thereto. The reaction mixture is heated to 115°C for 6 hours.

At the end of the reaction, the polymer is isolated by precipitation of the mixture in methyl alcohol.

90 g of cyanocarboxylate polymer is obtained, whose I.R. spectrum shows the presence of a cyclic lactone (absorption at 1815 cm$^{-1}$).

The nitrogen content of the polymer is about 1.6% by weight, which shows that 17% butadiene units have ethyl cyanoacetate added thereto.

EXAMPLE 2

0.92 g of cobalt octoate is added to a solution of 50 g of 1,4-polybutadine (86% of 1,4-cis units, 10% of 1,4-trans units and 4% of 1,2-units) of an average molecular weight by number of 2,050 in 68 cc xylene and 342 cc ethyl cyanoacetate. The mixture is stirred at 90°C for 5 hours while oxygen is supplied during this period at a rate of 0.2 cc/minute/g of polymer. The solution turns progressively to brownish orange. At the end of the reaction, the solvent and unreacted ester are removed by distillation under reduced pressure, and the residuum is washed several times with di-ethyl ether. 114 g of polybutadiene is thus obtained, whose 62% units have been cyanocarboxylated since the nitrogen content of the polymer is 5.7% by weight.

EXAMPLE 3

Example 2 is repeated while starting with a solution of 49 g of 1,4-polybutadiene in 324 cc of toluene and 85 cc of ethyl cyanoacetate, and using same cobalt octoate concentration and same oxygen feed rate. After 3 hours of reaction at 90°C, 83 g of polybutadiene is isolated, whose 32% units have been cyanocarboxylated, as deduced from the RMN spectrum of the polymer, by titrating the attached cyanocarboxylate groups according to the signal (multiplet located at 5.6 ppm) due to tertiary hydrogen located in $\alpha$ position with respect to the —COOR and —CN groups. The so determined value is in agreement with that calculated from the nitrogen content of the polymer, which amounts to 3% by weight.

If, by way of comparison, this example is repeated without addition of ethyl cyanoacetate, a gel forms after about 1 hour of reaction; the polymer isolated after 3 hours of reaction is completely cross-linked and insoluble; it does not contain any nitrogen.

EXAMPLE 4

Example 3 is repeated with a solution of 50 g of 1,4-polybutadiene in 367 cc of benzene and 43 cc of cyanoacetic acid. Under these conditions, a polymer is obtained after a 3 hours heating at 80°C; 11% of its units has been cyanocarboxylated.

EXAMPLE 5

100 g of 1,4-polybutadiene (89% of 1,4-cis units, 6% of 1,4-trans units and 5% of 1,2-units) of an average molecular weight by number of 3,500 is dissolved into 734 cc of ethyl acetate and 86 cc of ethyl cyanoacetate. 1.85 g of cabalt octoate is added and the reaction mixture is stirred at 77°C for 3 hours, while feeding oxygen at a rate of 0.2 cc/minute/g of polymer. The solution is evaporated under reduced pressure and 113 g of polybutadiene is obtained; 7% of the units are cyanocarboxylate units (nitrogen content equals 0.7% by weight). 10 g of this polymer is dissolved into 50 cc of xylene and 1 g of triethylene tetramine is added thereto; after heating of the mixture at 120°C for 1 hour, it is observed that the whole polymer has precipitated from the solution. The appearance of an absorption band characteristic of the amide bond in the I.R. spectrum of the polymer shows that cross-linking has taken place by condensation of the carboxylic groups of the cyanocarboxylate polymer with the amine added to the medium.

EXAMPLE 6

2.11 g of cobalt napththenate is added to a solution of 60 g of 1,4-cis polybutadiene of high molecular weight (Cariflex BR 1220, as produced by Shell) in 1400 cc of toluene and 100 cc of ethyl cyanoacetate; the reaction mixture is stirred at 90°C for 2 hours, while supplying air enriched with oxygen, so as to have 0.2 cc of oxygen per minute and gram of polymer. After reaction, the solution is poured into methyl alcohol for precipitation; the polymer is isolated by filtration and dried under reduced pressure up to constant weight. The IR spectrum of the polymer shows intense absorption for a wave number of about 1750 cm$^{-1}$, characteristic of the presence of a C=O bond in the polymer; the nitrogen content is about 2%, which corresponds to a modification ratio of 21%. The intrinsic viscosity of the polymer, as determined at 30°C in benzenic solution, is 1.93 dl/g.

EXAMPLE 7

100 g of butadiene and styrene rubber (commercial SBR) is dissolved into 3 liters of toluene; 46 g of diethyl cyanomalonate of the formula:

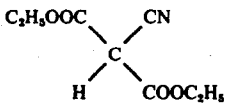

and 1.2 g of manganese acetate are added thereto. The reaction mixture is stirred for 6 hours at 90°C while supplying oxygen at a rate of 0.2 cc per minute and gram of polymer. The reaction product is isolated by precipitation of the reaction solution in alcohol; the nitrogen content equals 1.5% by weight, which shows a modification ratio of about 8%.

EXAMPLE 8

50 g of natural rubber (1,4-cis polyisoprene) is dissolved into 1400 cc of toluene; 0.9 g of cobalt octoate and 75 cc of butyl cyanoacetylacetate of the formula:

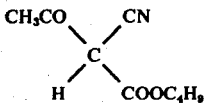

are added thereto and the reaction mixture is stirred at 90°C for 12 hours, while feeding dry air at a feed rate of 3 liters per hour. The polymer precipitates in excess alcohol; it is then washed several times with alcohol and dried in an aerated oven up to constant weight. The nitrogen content of the polymer thus obtained equals 1.9% by weight, which means that 13% of the isoprene units carry cyanoacetylacetate groups.

EXAMPLE 9

68 g of liquid polypentadiene having an average molecular weight by number of about 1,500 and containing 80% of 1,4-trans units is introduced into 250 cc of toluene and 100 cc of cyanoacetic acid. 1.4 g of tert-butyl perbenzoate is added and the mixture is heated at 100°C for 6 hours. The so-obtained polymer contains 4% of cyanocarboxylate units, according to the nitrogen dosage and the acid group titration.

What we claim:

1. A modified polymer containing β-cyanocarboxylic groups added to double bonds of a polymer of conjugated diolefin, said modified polymer being obtained by the additional reaction of one or more β-cyanocarboxyl ic compounds of the formula:

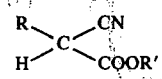

wherein each of the radicals R and R' represents a hydrogen atom or an alkyl, cycloalkyl, aryl or acyl group of 1–12 carbon atoms, or the radical R is a COOR' group or halogen with polybutadiene, polyisoprene or polypentadiene, or with a copolymer of (a) butadiene, isoprene or pentadiene and (b) styrene, acrylonitrile or methyl methacrylate.

2. A modified polymer according to claim 1, wherein the reaction is conducted in the presence of a radical initiator, preferably a peroxide or perester.

3. A modified polymer according to claim 1, wherein the reaction is effected in the presence of oxygen and a metal catalyst selected from the salts or chelates of metals from groups I B, VII B ama VIII, preferably cobalt, copper, manganese or tin bromides, acetates, acetylacetonates, naphthenates, benzoates or octoates.

4. A modified polymer according to claim 1, wherein the polymer of conjugated diolefin is polybutadiene.

5. A modified polymer according to claim 4, wherein the polybutadiene contains more than 80% of double bonds in 1,4-cis configuration.

6. A modified polymer according to claim 4, wherein the starting polybutadiene contains more than 60% of double bonds in the 1,2-configuration and wherein a part of the β-cyanocarboxylic groups is cyclized to β-cyano-γ-butyrolactone groups.

7. A modified polymer according to claim 1, wherein the β-cyanocarboxyl ic compound is cyanoacetic acid.

8. A modified polymer according to claim 1, wherein the β-cyanocarboxyl ic compound is ethyl cyanoacetate.

9. A modified polymer as defined by claim 1, wherein said homopolymer or copolymer of conjugated diolefin has a number average molecular weight within the range of 1,000 to 500,000.

10. A modified polymer as defined by claim 1, in which from 2 to 70 β-cyanocarboxylic groups are added, per each 100 unsaturated units of the starting polymer.

11. A modified polymer as defined by claim 5, wherein the polybutadiene has a number average molecular weight of from 1,500 to 200,000.

12. A polymer according to claim 1 having a number average molecular weight of 1,500–200,000 and being of the formula

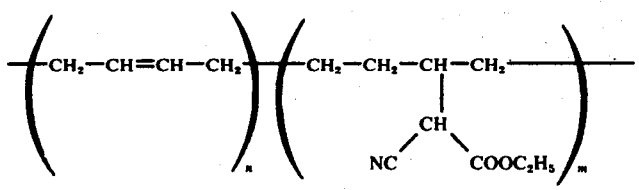

wherein $n$ and $m$ are integers $(n+m)$ representing more that 90% of the units constituting the polymer chain.

13. A polymer according to claim 1 of the formula:

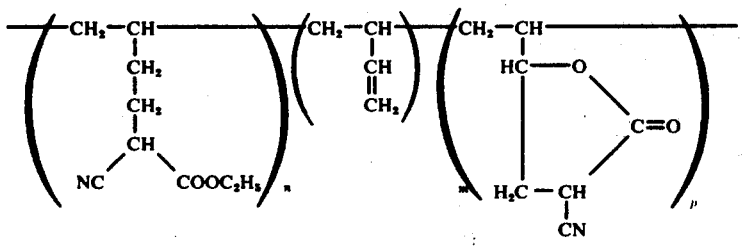

where $n$, $m$ and $p$ are integers, $(n+m+p)$ representing more than 60% of the units constituting the polymer chain.

* * * * *

UNITED STATES PATENT AND TRADEMARK OFFICE
CERTIFICATE OF CORRECTION

PATENT NO. : 3,972,867
DATED : August 3, 1976
INVENTOR(S) : Dawans et al.

It is certified that error appears in the above—identified patent and that said Letters Patent are hereby corrected as shown below:

[73] show read -- Assignee: INSTITUT FRANCAIS DU PETROLE --.

Signed and Sealed this

Eleventh Day of January 1977

[SEAL]

Attest:

RUTH C. MASON
*Attesting Officer*

C. MARSHALL DANN
*Commissioner of Patents and Trademarks*